United States Patent Office 3,199,280
Patented Aug. 10, 1965

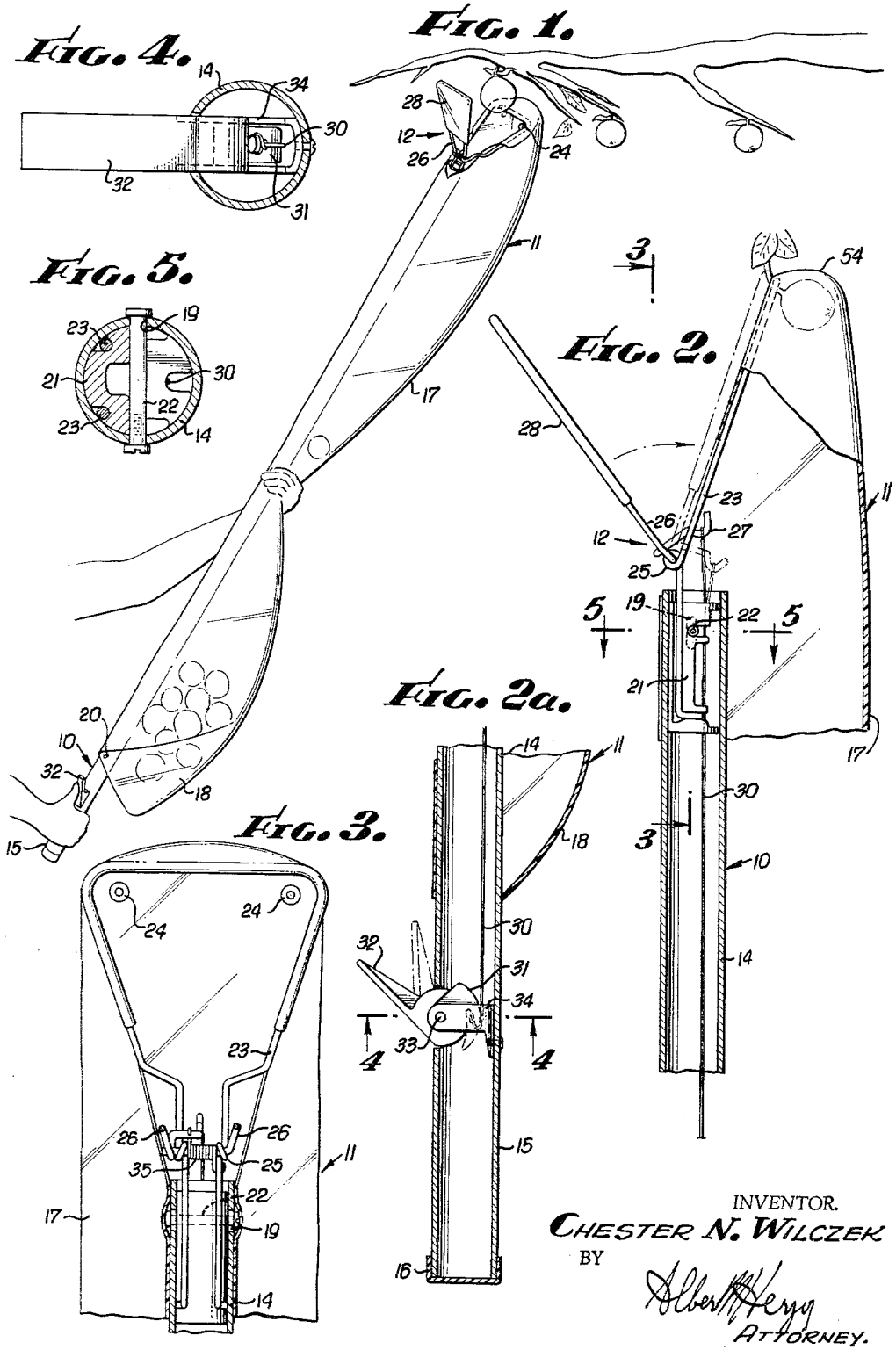

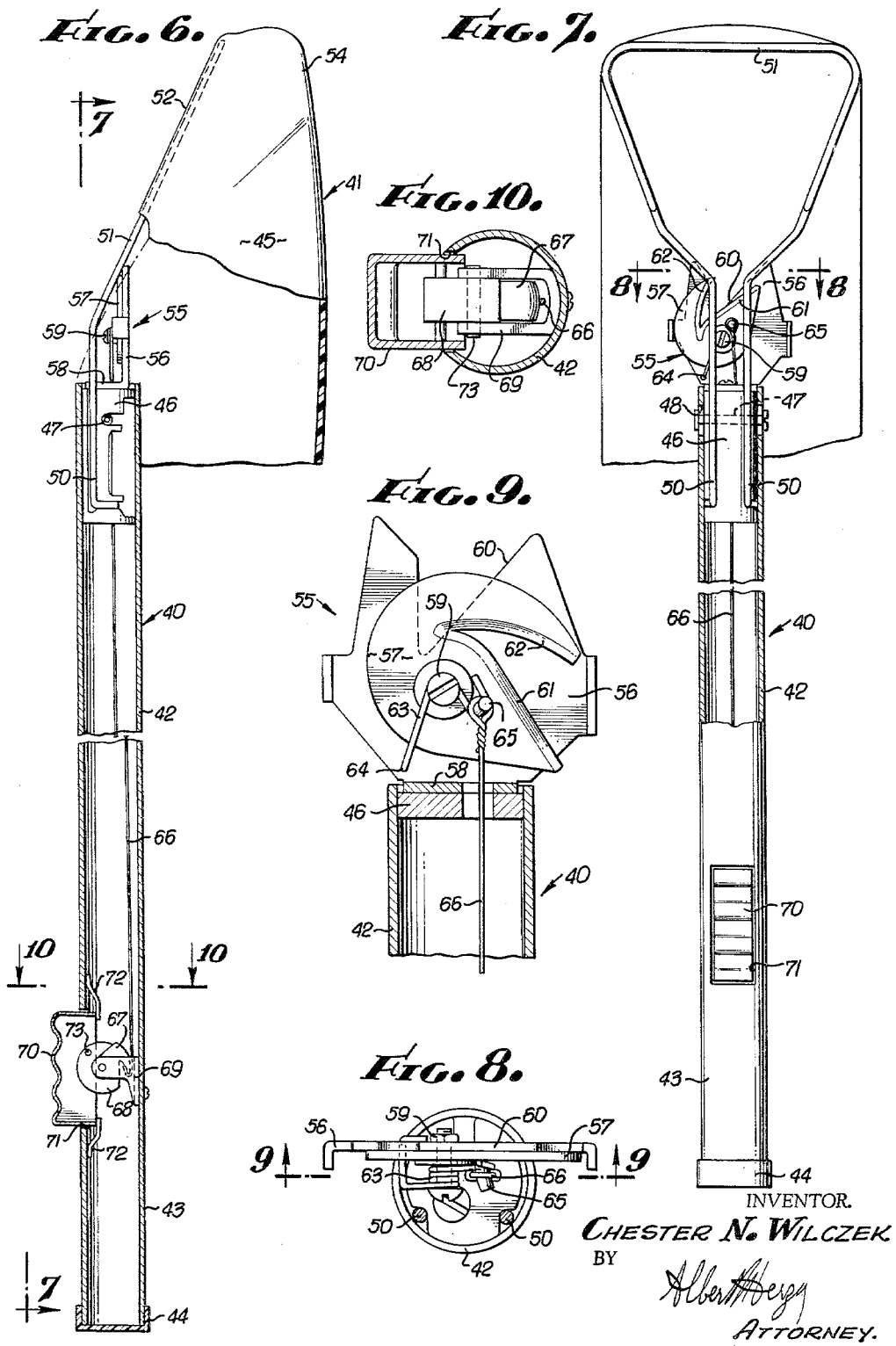

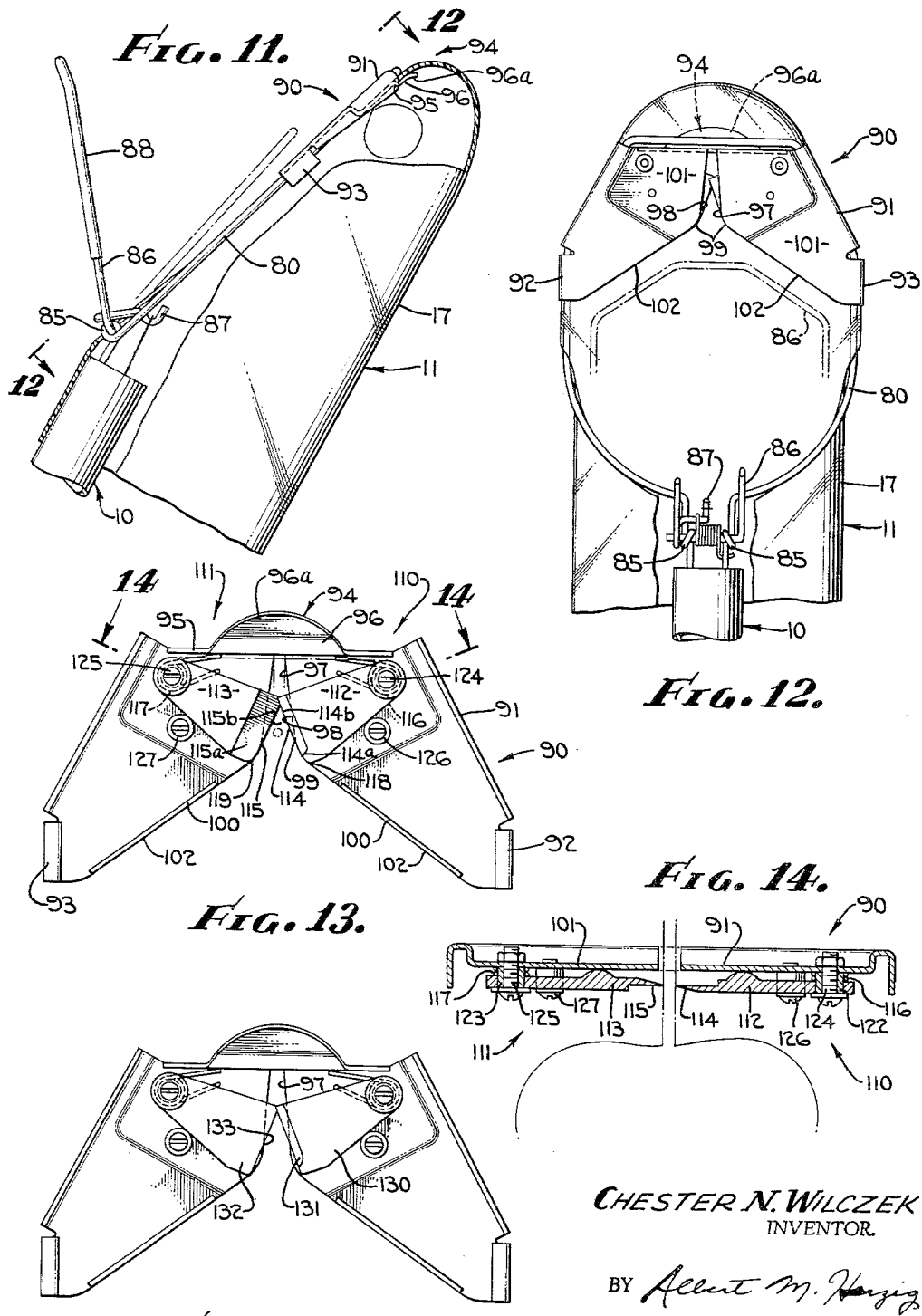

3,199,280
FRUIT PICKER
Chester N. Wilczek, 230 W. Walnut Ave., Arcadia, Calif.
Filed Jan. 30, 1963, Ser. No. 258,100
13 Claims. (Cl. 56—334)

This invention relates to harvesting apparatus and more especially to an improved fruit picker. This invention is a continuation-in-part of my previous application, Serial No. 195,837, filed May 18, 1962, for Fruit Picker.

An object of the invention is to provide a simple, practical and inexpensive fruit picker of the character described.

Another object of the invention is to provide an improved fruit picker that is light in weight, easy to operate and is of rigid construction.

Another object of the invention is to provide an improved fruit picker that is safe and fast in operation and yet is gentle in the handling of the picked fruit.

A further object of the invention is to provide an improved fruit picker which results in savings of time, money and labor in its operation.

Another object of the invention is to provide improvements in a fruit picker incorporating a tubular transparent conveyor made of plastic material that is sun-resistant in the sense that it contains an ultra-violet stabilizer whereby the normal life of the conveyor is greatly increased to the extent of twice that of the types heretofore known.

Another object of the invention is to provide in a fruit picker a conveyor or sock which is so dimensioned as to provide ample room for the conveying of the picked fruit from the upper end thereof to the lower end which forms in effect a basket to receive and contain a generous quantity of the picked fruit.

Another object of the invention is to provide a fruit picker having a conveyor or sock as in the previous objects, the lower end of which has a closure which may be readily opened to permit the picked fruit to be transferred to a carton, box or the like for transportation.

Another object of the present invention is a fruit picker adapted to utilize the weight of the fruit being picked to actuate its stem cutting means.

Another object of the present invention is a fruit picker having jaw members adapted to properly position the fruit being picked with respect to its stem cutting means.

Still another object of the present invention is an improved fruit picker adapted to easily cut the stems of the fruit being picked while protecting the fruit from damage from such cutting means.

Other objects and advantages of the invention will appear and be brought out more fully in the following specification, reference being made to the accompanying drawings which show an embodiment of the invention and shown by way of exemplification thereof but not of limitation.

In general, the present invention includes a fruit picker comprising a staff having a wire loop mounted at its upper end constituting a fixed jaw member. Adjoining the area enclosed by said fixed jaw member is the upper open end of a conveyor which is secured to said wire loop. Rotatably mounted at the upper end of said staff is a second wire loop constituting a movable jaw member. Said movable jaw member may be substantially the same size as said fixed jaw member and adapted to be rotated into contact with said fixed jaw member. Alternatively, said movable jaw member may be substantially smaller than said fixed jaw member so that it may be rotated through said fixed jaw member. In the latter case, said fixed jaw member supports a fruit-actuated stem cutting means which includes a mounting plate removably clamped onto the wire loop over the upper portion of said jaw area. Such mounting plate has a central notch with its open end adjoining said jaw area. Said mounting plate also has lower edges adjoining said jaw area adapted to slide the fruit stems contacting them into said notch when said fruit picker is pulled downward. Finally, said fruit-actuated stem cutting means includes a pair of severing means pivotally attached to the lower side of said mounting plate and separated by said notch, said pair of severing means being adapted to cut a fruit stem received in said notch.

In order to facilitate understanding of the present invention, reference will now be made to appended drawings of several preferred specific embodiments of the present invention. Such drawings should not be construed as limiting the invention which is properly set forth in the appended claims.

In the drawings:

FIG. 1 is a perspective view of a fruit picker embodying the present invention.

FIG. 2 is an enlarged view partly in section of the upper portion of the fruit picker shown in FIG. 1.

FIG. 2a is a view similar to FIG. 2 showing the lower portion of the fruit picker.

FIG. 3 is a view taken along line 3—3 of FIG. 2.

FIG. 4 is an enlarged sectional view taken along line 4—4 of FIG. 2a.

FIG. 5 is a sectional view enlarged taken along line 5—5 of FIG. 2.

FIG. 6 is a view similar to FIG. 2 showing a modified form of the invention.

FIG. 7 is a sectional view taken along line 7—7 of FIG. 6.

FIG. 8 is an enlarged sectional view taken along line 8—8 of FIG. 7.

FIG. 9 is a fragmentary or a partial view showing the cutting means of the embodiment shown in FIGS. 6 and 7 in elevation and showing the tube in section taken along line 9—9 of FIG. 8.

FIG. 10 is an enlarged sectional view taken along line 10—10 of FIG. 6.

FIG. 11 is a view partly in section of the upper portion of still another embodiment of the fruit picker of the present invention.

FIG. 12 is a view taken along line 12—12 of FIG. 11.

FIG. 13 is a plan view of the lower side of the fruit-actuated stem cutting means shown in FIGS. 11 and 12.

FIG. 14 is a cross-section of the stem cutting means of FIG. 13 taken along the lines 14—14 of FIG. 13.

FIG. 15 is a plan view of the lower side of another embodiment of the fruit-actuated stem cutting means.

Referring more particularly to the drawings, the fruit picker of this invention comprises three essential elements: a staff 10, conveyor or sock 11 and a jaw or mouth unit 12. Staff 10 is a tube 14 made of a lightweight material, such as aluminum, and has a handle portion 15 at its lower end which may be closed by a cap 16 of rubber, plastic or other suitable material.

Conveyer or sock 11 comprises an elongated envelope or tube 17 preferably of a transparent thermoplastic material having a suitable wall thickness to provide the desired strength and is of a length slightly shorter than that of staff 10 so that the handle portion 15 extends downwardly beyond the lower end of the conveyor. Tube 17 is of a cross-section size several times that of the size of the cross-section of staff 10 so as to permit the conveying without injury of fruit of ample size. The open lower end of tube 17 is formed at an angle from staff 10 to permit a portion thereof of the tube to be folded over on itself to form a flap 18 which may be provided with a button or snap fastener securement 20 thus forming an enlarged pocket for temporarily containing picked fruit until it is released or dumped from a pocket into a carton or box for transportation or shipping to a collecting or storage location.

A bracket or fixture 21 is adjustably secured in tube 14 as by a transverse lock pin 22 extending through a slot 19 in the tube and secures the lower ends of a wire 23 the central or upper portion thereof being formed as a loop and constituting a fixed jaw member of the mouth formation which includes the upper end of tube 17 of the conveyor 11. The upper end edge portion of the tube 17 is folded around wire 23 and is detachably secured on the wire as by snap fasteners or the equivalent 24.

Wire 23 has a pair of loop formations 25 which form bearings for the transversely bent end portion of a wire 26 which has a loop formation corresponding in form and size to the loop of wire 23, the other end of wire 26 being bent around the first mentioned end thereof and terminating in a lever arm and hook 27. A sheet of plastic 28 is secured across the loop formed by wire 26 and comprises a jaw of the mouth 12 of the picker.

A wire or cable 30 has one end thereof secured on hook 27 and extends downwardly through staff tube 14 and its other end is secured on the arcuate portion 31 of a lever 32 which has a pivot support 33 carried by a bracket 34 also contained within tube 14 adjacent the handle portion 15 thereof. A coil spring 35 has one end thereof secured to the hook end 27 of wire 26 and the other end thereof to wire 23 in such manner as to normally maintain the jaw formed by wire 26 and the envelope 28 in open condition as seen in FIGS. 1 and 2. The torsion spring 35 holds the wire 30 taut. The degree of maximum jaw opening is determined by adjusting the position of bracket 21 in tube 14 held by lock pin 22.

The manner of use and operation of invention as described should be clear from the foregoing description with particular reference to FIG. 1. This figure shows the fruit picker being held by a worker with the jaw 12 open and just below a fruit, such as an orange or apple, held by a twig from a branch of a tree. Upon actuation of lever 32 wire or cable 30 will be pulled down thus closing the jaw member 26 on jaw member 23 whereupon the fruit may be pulled from the branch whereupon it drops into the upper part of tube or conveyor 11 from whence it is conducted or conveyed to the lower end thereof. FIG. 1 illustrates the manner in which the plastic tube or sock 17 may be partially collapsed to prevent the fruit from dropping to the bottom of the tube in one movement which might result in injury or crushing of the fruit.

Referring now to FIGS. 6 to 10 which show a modified form of the invention, the fruit picker of this modification comprises a staff 40 and a conveyor or sock 41 generally similar to the staff and conveyor or sock of FIGS. 1–5. Staff 40 comprises a tube 42 made of a lightweight material and has a handle portion 43 at its lower end which may be closed by a cap 44, of rubber, plastic or other suitable material. Conveyor or sock 41 comprises an elongated envelope or tube 45 generally similar to tube 17.

A bracket or plug 46 is secured in tube 42 at the upper end thereof as by transverse lock pin 47 adjustably secured in a slot 48 in the tube 42. Bracket or plug 46 secures the lower ends of a wire 50 having an upper central or loop portion 51. The upper open end portion of tube or envelope 45 is folded around loop portion 51 as at 52 and secured to the wire by snap fasteners or the equivalent. The upper end of envelope or tube 45 is enlarged as at 54 to provide a pocket or space in which to receive the fruit as it enters the envelope or tube upon being picked.

A fruit stem cutter device 55 is secured on the upper end of staff 40 and has a fixed cutter blade member 56 having a laterally extending foot 58 by which it is secured on the upper end of fixture or plug 46 and suitably secured to it by a screw. The cutter device includes a rotary blade 57 pivoted to fixed blade 56 as by a pivot screw 59. Blade 56 has a somewhat triangular shaped cut-out portion forming a cutting blade 60 and rotary blade 57 has a similar cut-out portion forming cutting edges 61 and 62, respectively. Cutting edge 62 is curved or arcuately shaped as shown for holding the stem of a fruit article against blade 60 during the cutting operation. A coil spring 63 is positioned on pivot screw 59 and has one end thereof extended through and held in an aperture 64 in fixed blade element 56. The other end of spring 63 is wound around or otherwise suitably secured to a pin 65 which extends outwardly from blade element 57 by which arrangement the spring biases the cutter blade member 57 in the open position and returns it to open position after actuation.

A cord, cable or wire 66 is also connected to pin 65 and is extended through plug 46 and tube 42 and has its lower end connected or secured on the arcuate portion 67 of a disc 68 which has a pivot support on a bracket 69 suitably secured within tube 42 adjacent handle 43. An actuating grip member 70 suitably formed to comprise a hand grip extends through a slot 71 in tube 42 and is biased outwardly by springs 72. Grip member 70 is provided with an elongated recess to receive a portion of disc 68 to which it is secured by a pin 73.

The operation of the invention as shown in FIGS. 6–10 should be apparent from the description thereof. The picker is manipulated in the manner shown in FIG. 1 so that the fruit enters the enlargement 54 of the sock 41 and with the stem thereof positioned between blades 60 and 62 of the cutter device 55. Upon actuation of the handle member 70, the wire or cable 66 will be pulled down thus rotating the movable rotary cutter member 57 whereupon the stem of the fruit will be cut and the fruit will be freed and passed down the envelope 45 to the bottom thereof and be retained until released or dumped from the pockets formed by flaps 18.

Still another embodiment of the present invention is illustrated in FIGS. 11–14. As illustrated in FIGS. 11 and 12, the staff 10 utilizes a wire loop 80 mounted at its upper end to constitute a fixed jaw member. Similar to FIGS. 1–5, the conveyor 11 includes a tube 17 having an open upper end adjoining the area enclosed by the fixed jaw member 80. Also, the wire 80 has a pair of loop formations 85 which form bearings for the transversely bent end portion of a wire loop 86. The other end of wire loop 86 is bent around the first mentioned end thereof and terminates in a lever arm and hook 87. The second wire loop 86 is thus rotatably mounted at the upper end of the staff 10 and constitutes the movable jaw member. A sheet of plastic 88 is secured across the loop formed by the wire 86, i.e. the jaw area. Unlike the second loop of wire 26 in FIGS. 1–5 which corresponds in form and size to the first loop of wire 23, the second loop of wire 86 is substantially smaller in size than the fixed jaw member 80, although it corresponds generally to the same form. Thus, the movable jaw member 86 may be rotated through said fixed jaw member. The operating means adapted to rotate said movable jaw member are identical to the operating means set forth in connection with FIGS. 1–5. However, said operating means in the instant embodiment of the present invention will rotate the movable jaw member through said fixed jaw member so that the fruit is grasped and positioned in the upper end of the conveyor 11 with its stem positioned in the fruit-acutated stem cutting means set forth below.

Also is should be noted that the hook 87 is positioned substantially forward of the staff 10 to prevent fruit passing down the tube 17 from coming into contact with it.

The fruit-actuated stem cutting means 90 includes a mounting plate 91 which is removably clamped onto the wire loop 80 over the upper portion of its jaw area by means of fingers 92 and 93 and a projection 94. The projection 94 includes both a first panel 95 perpendicular to the mounting plate 91 and a second panel 96 parallel to the mounting plate 91 ending with a curved panel 96a at 45 degrees to panel 96 which are adapted to give the mounting plate resistance to bending movements operating either in the plane of the mounting plate or in either of two planes perpendicular to the plane of the mounting plate. Also, the projection 94 in conjunction with the fingers 92 and 93 insures that the mounting plate 91 is firmly held in position on the wire loop 80, except when a portion of the wire loop 80 is bent inwardly to permit the mounting plate 91 to be slipped off. The mounting plate 91 has a central notch 97 therein with its open end 98 adjoining the jaw area of the fixed jaw 80. The corners 99 of said notch 97 adjoining said jaw area have guard means 100 dependent therefrom to protect the fruit being picked. Preferably, the central portion 101 of the mounting plate 91 is recessed into the jaw area 80 so that the severing means 110 and 111 are positioned adjacent to the base of the stem of the fruit being picked. As noted above, the upper end of the envelope or tube 17 is preferably enlarged to extend forward of the fixed jaw member 89. The pocket formed thereby is adapted to receive fruit whose stem is positioned in the fruit-actuated stem cutting means of the present invention. The lower edges 102 adjoining the jaw area are adapted to slide the fruit stems contacting them into the notch 97 when said fruit picker is pulled downward. Preferably, each of the lower edges 102 of the mounting plate 91 form an angle to the axis of the staff 10 in the range between about 30° to 60°. Such lower edges 102, if desired, may also be curved to facilitate the sliding of the fruit stems into the notch 97.

The fruit-actuated stem cutting means 90 also includes a pair of severing means 110 and 111 pivotally attached to the lower side of the mounting plate 91 and separated by the notch 97. The severing means 110 and 111 are adapted to cut a fruit stem received in said notch when the fruit picker is pulled downward. As illustrated in FIGS. 11–14, each severing means comprises a knife 112 and 113, respectively, having a cutting edge 114 and 115, respectively. Each of the knives 112 and 113 is biased by a hair spring 116 and 117, respectively, into an open position (as shown) wherein the lower portion 114a and 115a of the cutting edges 114 and 115, respectively, extend under the adjoining notch edge 98 and the upper portion 114b and 115b, respectively, extend into the notch area and overlap the other knife cutting edge. As illustrated, each of the knives 112 and 113 are adapted to being rotated by a fruit stem (illustrated in outline) against its cutting edge into a closed position (shown in dotted lines in FIG. 14) wherein each of the cutting edges 114 and 115 overlaps the other cutting edge over substantially its entire length. When in their open position, the cutting edges 114 and 115 preferably have an angle between them in the range between about 20° to 60°. Also, preferably the lower corner portions 118 and 119 of the cutting edges 114 and 115 are blunt to protect the fruit being picked.

Each of the knives 112 and 113 are separated from the lower side 91 by their spring-biasing means 116 and 117. As illustrated, the spring-biasing means comprises a pair of hair springs 116 and 117 which are mounted on sleeves 122 and 123. Similarly, the knives 112 and 113 themselves are pivotally mounted on the sleeves 122 and 123, respectively, and stopped in their open positions by bosses 126 and 127, respectively. The sleeves 122 and 123 are in turn rotatably mounted on shafts 124 and 125, respectively, which are attached to the mounting plate. As illustrated, the knife means 112 and 113 have the cutting edges 114 and 115 as an integral portion thereof. However, the cutting edges may be separate elements which may be inserted into slots in the knives 112 and 113 and fixed therein by appropriate means, such as screws.

The manner of use and operation of the specific embodiment of the present invention illustrated in FIGS. 11–14 should be clear from the foregoing description and particularly in connection with the description of FIGS. 1–5. The fruit picker is held by a worker with the movable jaw 86 open and the fixed jaw 89 surrounding the stem of the fruit, such as an orange or apple. Upon the actuation of the lever 32, the wire 30 will be pulled down, closing the movable jaw member 86 so that the fruit is forced into the pocket 54 of the tube 11 with its stem resting on the lower edge 102 of the mounting plate 91. When the staff 10 is then pulled downward by the worker, the stem of the fruit slides into the notch 97 where it is cut by the severing means 110 and 111. The fruit then drops into the upper part of the tube 11 from whence it may be conducted to the lower end thereof.

As illustrated in FIG. 15, the severing means alternatively may comprise a knife 130 having a cutting edge 131 adjoining the notch 97, and the other severing means 132 may have a flat surface or anvil 133 which is adapted to receive the cutting edge 131. The operation of such severing means is the same except that the cutting is done by the contact of the cutting edge 131 with the anvil 133.

Many other specific embodiments of the present invention will be obvious to one skilled in the art in view of this disclosure. For example, the cutting edges may be either smooth, as illustrated, or serrated where a sawing action is desired. Furthermore, as already noted, the severing means may comprise two cutting edges or one cutting edge and an anvil adapted to receive such cutting edge. Such cutting edges may be either straight, as illustrated, or circular, if desired. Furthermore, the movable jaw means may be smaller than the fixed jaw means and adapted to rotate through said fixed jaw means to position the stem of the fruit properly adjacent the stem cutting means. Alternatively, the movable jaw means may be the same size or larger than the fixed jaw means so that the fruit may be pulled off by the jaw means or the movable jaw means positions the stem of the fruit in the cutting means from above the fixed jaw means.

There are many features in the present invention which clearly show the significant advance the present invention represents over the prior art. Consequently, only a few of the more outstanding feautres will be pointed out to illustrate the unexpected and unusual results attained by the present invention. A particular feature of novelty is the formation of the tube or conveyor 11 which is preferably a vinyl thermoplastic containing an ultra-violet stabilizer which thus renders the conveyor sun-resistant. By this character of the conveyor the conveyor has a long sun life which may reach double that of comparable conveyors that are not so constituted.

Another feature of the present invention is a stem cutting means wherein the weight of the fruit itself actuates the cutting action rather than requiring operating means adjacent the lower end of the fruit picker. Such cutting means is adapted to sever the stem of the fruit adjacent the base of the stem merely by pulling downward on the fruit picker. Another feature of the present invention is a pair of jaw means which is adapted to pick one fruit out of a cluster of fruit and remove it.

It will be understood that the foregoing description and examples are only illustrative of the present invention and it is not intended that the invention be limited thereto. All substitutions, alterations, and modifications of the present invention which come within the scope of the following calims or to which the present invention is readily susceptible without departing from the spirit and scope of this disclosure are considered part of the present invention.

I claim:
1. A fruit picker adapted to utilize the weight of the fruit being picked to actuate its stem cutting means, comprising:
   (a) a staff having a wire loop mounted at its upper end constituting a fixed jaw member;
   (b) a conveyor having an upper open end adjoining said jaw member and being secured to said wire loop; and
   (c) a fruit-actuated stem cutting means including:
      (I) a mounting plate adapted to be removably clamped on to said wire loop over the upper portion of said jaw member, said mounting plate having
         (A) a central notch with its open end adjoining said jaw member, and
         (B) its lower edges adjoining said jaw member adapted to slide the fruit stems contacting them into said notch when said fruit picker is pulled downward,
      (II) a pair of knives each independently pivotally attached to the lower side of said mounting plate and separated by said notch, each of said knives:
         (A) having a cutting edge adjoining said notch said cutting edge being spaced from said pivoted attachment substantially by the length of said knife,
         (B) being spring-biased into an open position wherein the lower portion of its cutting edge extends under the adjoining notch edge and the upper portion of its cutting edge extends into said notch area and overlaps the other knife-cutting edge,
         (C) being adapted to being rotated by a fruit stem pushing against its cutting edge into a closed position wherein each of said cutting edges overlaps the other knife-cutting edge substantially over its entire length.

2. A fruit picker as stated in claim 1 wherein each of the lower edges of said mounting plate form an angle through the axis of said staff in the range between about 30° to 60°.

3. A fruit picker as stated in claim 1 wherein the central portion of said mounting plate is recessed into said jaw member so that said cutting means is positioned adjacent to the base of the stem of the fruit being picked.

4. A fruit picker as stated in claim 1 wherein the staff of said fruit picker has a second wire loop rotatably mounted at its upper end consituting a movable jaw member, said movable jaw member:
   (a) being spring-biased into a position remote from said fixed jaw member,
   (b) being substantially smaller than said fixed jaw member,
   (c) being adapted to be rotated by operating means at the lower end of said staff through said fixed jaw member and past said mounting plate so that fruit is grasped and positioned in the upper end of said conveyor with its stem riding on one of the lower edges of said mounting plate.

5. A fruit picker as stated in claim 1 wherein the angle between the said cutting edges is in the range between about 20° to 60°.

6. A fruit picker as stated in claim 1 wherein said conveyor has an enlarged upper end pocket extending forward of said fixed jaw member which is adapted to receive fruit whose stem is positioned in said fruit-actuated stem cutting means.

7. A fruit picker as stated in claim 1 wherein the lower corner portions of said cutting edges are blunt to protect the fruit being picked.

8. A fruit picker as stated in claim 1 wherein the corners of said notch adjoining said jaw area have guard means mounted thereon to protect the fruit being picked.

9. A fruit picker adapted to utilize the weight of the fruit being picked to actuate its stem cutting means, comprising:
   (a) a staff having a wire loop mounted at its upper end constituting a fixed jaw member;
   (b) a fruit-actuated stem cutting means including:
      (I) a mounting plate removably clamped on to said wire loop over the upper portion of said jaw member, said mounting plate having:
         (A) a central notch with its open end adjoining said jaw member, and
         (B) its lower edges adjoining said jaw member adapted to slide the fruit stems contacting them into said notch when said fruit picker is pulled downward, and
      (II) a pair of severing means each independently pivotally attached to the lower side of said mounting plate and separated by said notch, the portion of each of said severing means adjoining said notch being spaced from said pivotal attachment substantially by the length of said severing means.

10. A fruit picker as stated in claim 9 wherein each of said severing means is a knife having a cutting edge adjoining said notch.

11. A fruit picker as stated in claim 9 wherein one of said severing means is a knife having a cutting edge adjoining said notch and the other said severing means is an anvil for said cutting edge.

12. A fruit picker as stated in claim 9 wherein the staff of said fruit picker has a second wire loop rotatably mounted at its upper end constituting a movable jaw member, said movable jaw member:
   (a) being spring-biased into a position remote from said fixed jaw member,
   (b) being substantially smaller than said fixed jaw member,
   (c) being adapted to be rotated by operating means at lower end of said staff through said fixed jaw member and past said mounting plate so that fruit is grasped and positioned in the upper end of said conveyor with its stem riding on one of the lower edges of said mounting plate.

13. A fruit picker as stated in claim 1 wherein said stem cutting means includes two shafts attached to said mounting plate and a sleeve slidably mounted on each of said shafts, each of said knives being pivotally mounted on one of said sleeves and being separated from the lower side of said mounting plate by said spring-biasing means.

References Cited by the Examiner

UNITED STATES PATENTS

| | | | |
|---|---|---|---|
| 459,660 | 9/91 | Smith | 56—335 |
| 595,160 | 12/97 | Funk | 56—334 |
| 999,388 | 8/11 | McGrail et al. | 56—334 |
| 1,023,709 | 4/12 | Baker | 56—335 |
| 1,309,712 | 7/19 | Adams | 56—338 |
| 2,346,986 | 4/44 | Metzger | 56—335 |
| 2,516,540 | 7/50 | Barkschat | 56—338 |
| 2,990,668 | 7/61 | Brendel | 56—333 |

FOREIGN PATENTS

| | | |
|---|---|---|
| 1,166,621 | 6/58 | France. |
| 11,224 | 3/14 | Great Britain. |
| 759,746 | 10/56 | Great Britain. |

T. GRAHAM CRAVER, *Primary Examiner.*

RUSSELL R. KINSEY, *Examiner.*